United States Patent [19]
DeConti

[11] Patent Number: 5,358,077
[45] Date of Patent: Oct. 25, 1994

[54] ONE PIECE LIQUID COOLED DISC BRAKE ASSEMBLY

[76] Inventor: John P. DeConti, 328 Maple St., New Britain, Conn. 06051

[21] Appl. No.: 13,714

[22] Filed: Feb. 4, 1993

[51] Int. Cl.⁵ .................. F16D 55/02; F16D 65/78
[52] U.S. Cl. ................... 188/71.6; 188/264 D; 192/113.31
[58] Field of Search ........ 188/218 XL, 264 R, 264 A, 188/264 AA, 264 D, 71.6; 192/70.12, 113 SP; 73/862.11, 862.12; 74/574

[56] References Cited

U.S. PATENT DOCUMENTS

| | | | |
|---|---|---|---|
| 2,909,258 | 10/1959 | LaCroix, Jr. | 192/113 SP X |
| 2,982,377 | 5/1961 | Eames | 188/264 D |
| 2,997,312 | 8/1961 | Müller | 280/660 |
| 4,013,148 | 5/1977 | Kobelt | 188/264 D |
| 4,217,775 | 8/1980 | Hikari | 73/862.12 |
| 5,003,829 | 4/1991 | DeConti et al. | 73/862.12 |

FOREIGN PATENT DOCUMENTS 653565  5/1951  United Kingdom .

Primary Examiner—Robert J. Oberleitner
Assistant Examiner—Josie A. Ballato
Attorney, Agent, or Firm—Ware, Fressola, Van Der Sluys & Adolphson

[57] ABSTRACT

An improved internally liquid-cooled disc assembly for use in a disc braking system includes a one-piece disc casting having a plurality of cooling cells formed therein. Cooling liquid flows along an incoming flow path formed between an inner flange and a middle flange and, by centripetal force, is forced into the plurality of cooling cells via a corresponding plurality of flow tubes. The cooling liquid absorbs heat generated by a forced braking action against the one-piece disc casting and exits the plurality of cooling cells in a heated liquid/gas state. The heated cooling liquid/gas flows along an outgoing flow path formed between the middle flange and an outer flange. An optional propelling action is created along the incoming flow path by a plurality of impeller fins. An optional pumping action is created along the outgoing flow path by a plurality of stator vanes.

32 Claims, 17 Drawing Sheets

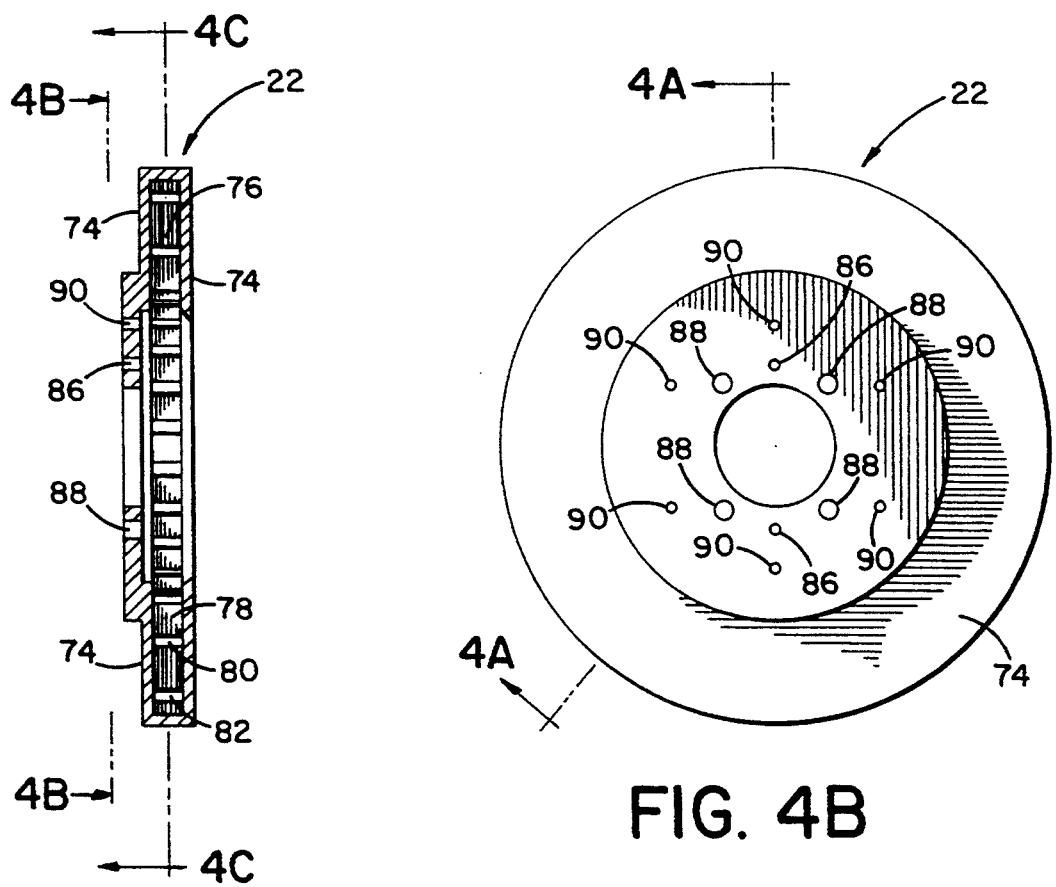
FIG. 4A
FIG. 4B
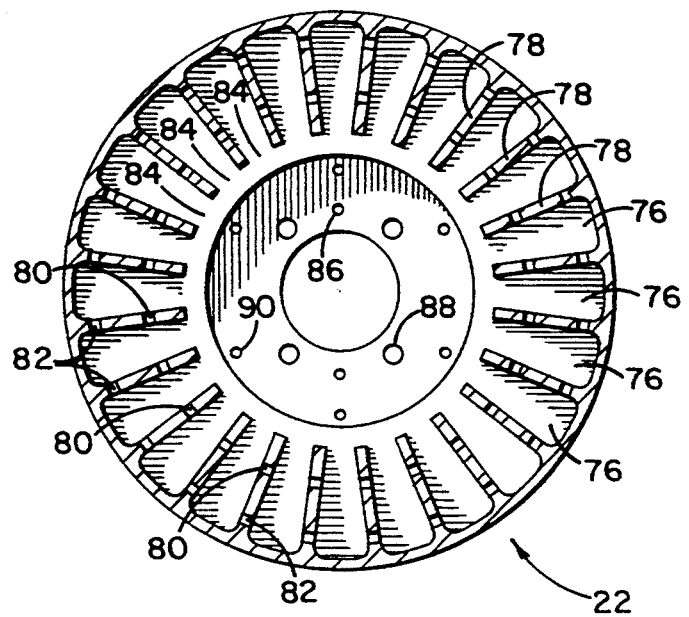
FIG. 4C

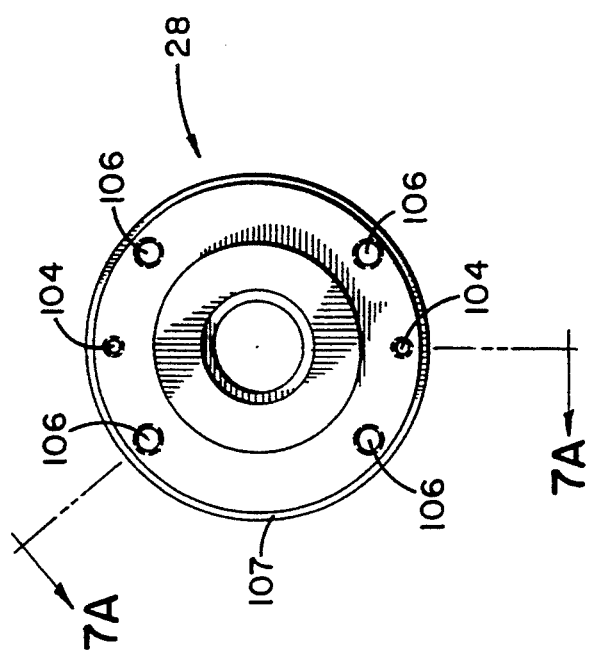
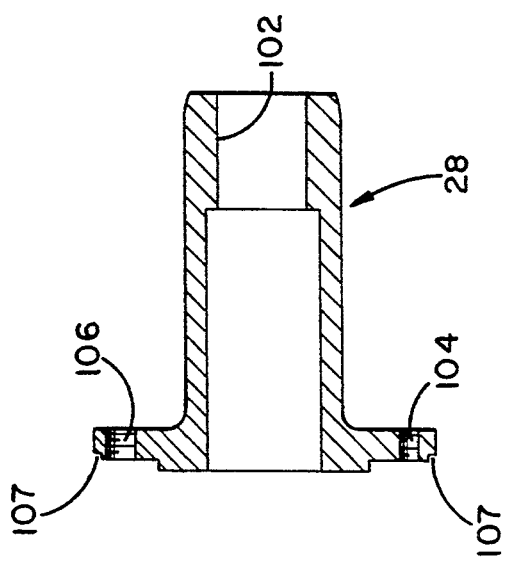

ONE PIECE LIQUID COOLED DISC BRAKE ASSEMBLY

BACKGROUND OF THE INVENTION

1. Field of the Invention

The present invention relates to an energy absorption system that incorporates an internally liquid-cooled disc and, more particularly, to an improved energy absorption system wherein the internally liquid-cooled disc is in the form of a one piece casting.

2. Description of the Prior Art

Disc braking systems have been used for many years to brake automobiles, aircraft, trucks, and other vehicles. Such braking systems are also used as dynamometers to absorb kinetic energy associated with systems that test power output from power plants, engines, and the like. Disc braking systems are chosen over other braking means, such as drum brakes, for various reasons including braking effectiveness (anti-fading), cost, and serviceability.

Generally, a disc braking system includes a rotating disc upon which a braking or retarding force is applied. The rotating disc is connected to a rotating shaft and stationary brake pads are forced against the rotating disc to effectuate the braking action. The stationary brake pads are held in place by calipers that are normally hydraulically controlled; that is, hydraulic pressure forces the brake pads against the row, ting disc. The rotating disc possesses a kinetic energy which is transformed into heat via friction as the disc decelerates between the brake pads. Under normal conditions, such as decelerating an automobile operating at normal highway speed, the heat generated by the friction is dissipated from the disc and the brake pads to the surrounding air. However, during longer and harder periods of braking, such as braking a car or truck while descending long downhill grades, the disc braking system may no longer be cooled at an adequate rate, thereby adversely affecting their braking capability. When such operating conditions are encountered, the disc and brake pads become excessively hot and deteriorate rapidly.

The deterioration of the disc braking system becomes especially apparent for conditions where there is a high energy transfer rate, such as a kinetic energy transfer associated with rapid braking of a racing car traveling at high speed. In such situations, the use of air to cool the disc braking system is generally insufficient to prevent excessive disc and brake pad wear. Other more effective heat transfer methods have been utilized. One such method involves spraying a liquid, such as water, directly on the rotating disc as it is braking, thus allowing the heat to be transferred to the liquid. This method, though increasing the heat transfer rate, creates a braking hazard because the coefficient of friction between the disc and the pads will vary dramatically as a function of disc/pads temperature and the amount of liquid between the disc and the pads. Thus, an externally liquid-cooled disc braking system, though extending the disc and brake pads lives, can create unreasonable risks and cannot be effectively controlled.

Dynamometers are devices for absorbing and measuring energy output of power plants, engines, or other mechanical energy producing devices (MEPD's). In operation, the MEPD can be directly connected, via a crankshaft, or indirectly coupled, via a power transfer means (i.e. a vehicle's drive wheel), to the dynamometer. A retarding torque is applied to the MEPD by the dynamometer. The MEPD's output torque is then measured at a resultant angular speed. The dynamometer must be capable of applying sufficient reactive torque while effectively dissipating the absorbed energy through heat transfer so as to maintain the dynamometer within a safe operating range.

Various methods of power absorption have been utilized in dynamometers. A dynamometer employing a disc braking system using air cooling has restricted power absorption capability due to heat transfer limits of the air contacting the disc and pads. Such dynamometers are therefore restricted to testing MEPD's of low power capability, with such testing generally limited to short periods of time. Also, externally liquid-cooled disc brakes which spray liquid onto the disc to dissipate heat are not particularly suitable for dynamometers since such cooling is generally not uniform, therefore making accurate torque measurement difficult.

Some internally liquid-cooled disc braking systems have been developed to overcome the difficulties associated with externally liquid-cooled disc braking systems. The internally liquid-cooled disc braking systems operate by injecting a cooling liquid into the disc, which has an internal cavity. The heat generated during braking is transferred to the liquid, and the liquid, now at a higher temperature, is forced out of the disc. The system can be either open or closed loop and in either case the cooling is generally uniform and the liquid does not come between the disc and the brake pads. Thus, an internally liquid-cooled disc braking system overcomes the difficulties associated with externally liquid-cooled disc braking systems.

In some instances, the amount of energy absorbed by an internally liquid-cooled disc braking system is large enough to vaporize the liquid. Such instances typically result in maximum heat transfer for a given change in temperature, a condition commonly known as the latent heat of vaporization of the liquid. Thus, internally liquid-cooled braking systems which operate at the latent heat of vaporization of the liquid typically provide maximum energy absorption.

Although maximum heat transfer occurs at vaporization, other conditions result which can cause problems for internally liquid-cooled systems. More specifically, the liquid vaporization, if not allowed to expand, generates a large amount of pressure which can block the entry of incoming liquid. If the cooling liquid is blocked, a condition known as vapor lock, the vaporized liquid will superheat, thereby disabling the energy absorbing effect.

Various designs for internally liquid-cooled braking systems are disclosed in several prior art devices. In particular, U.S. Pat. No. 5,003,829, entitled, Energy Absorbing Device and Torque Measuring Apparatus Therefor, assigned to the inventor of the present invention, and hereby incorporated by reference, discloses an internally liquid-cooled disc braking system that disperses cooling liquid to cooling cells formed internal to the disc and utilizes the latent heat of vaporization of the liquid for maximum cooling. The problem of vapor lock is overcome by directing the cooling liquid into the cooling cells, through flow tubes positioned within the cooling cells, before vaporization can occur. A centripetal force on the liquid through the flow tubes then forces the liquid/vapor out of the cells. In this system 10, shown in FIG. 1, the cooling cells 12 are molded into two disc halves 14a and 14b, which are welded together after the flow tubes 16 are inserted in place. The welding must be performed such that the cooling cells 12 on the two disc halves 14a and 14b are aligned and the cooling liquid within the cells 12 does not leak. Such a welding process can be time consuming and the weld itself could crack as a result of the thermal variations inherent in the system 10. The present invention alleviates these concerns with the fabrication of an internally liquid-cooled disc in the form of a one piece casting.

Other designs for internally liquid-cooled braking systems are disclosed in U.S. Pat. Nos. 2,982,377, 2,997,312, 4,013,148, and 4,217,775, and British Patent No. 653,565. Most of these designs do not address the problem of vapor lock and some have other attendant limitations. A description of these designs, and a discussion of their differences and shortcomings when compared to the present invention, is included in the above-referenced U.S. Pat. No. 5,003,829, which is incorporated herein.

SUMMARY OF THE INVENTION

The present invention contemplates an internally liquid-cooled disc braking system, comprising an internally liquid-cooled disc in the form of a one piece casting. The disc is fabricated using a core molding process such that a plurality of cooling cells may be formed therein. A like plurality of flow tubes positioned within the cooling cells may also be formed by the coring process or they may be fabricated and positioned separately. A series of flanges are secured to the disc so as to direct the flow of cooling liquid.

The braking system operates by directing the flow of the cooling liquid near the center of the disc and, by centripetal force, forcing the liquid into the cooling cells via the flow tubes. Once in the cooling cells, the cooling liquid contacts the walls of the cells so as to rapidly absorb heat therefrom. The liquid is able to vaporize if the cell walls are at an elevated temperature, thereby greatly increasing the heat transfer capabilities of the disc due to the latent heat of vaporization of the liquid. The heated liquid/vapor exits the cells via vent holes, also formed in the molding process.

The present invention circumvents the problem of vapor lock through the use of the flow tubes. The flow tubes route the cooling liquid into the cooling cells, and to the disc's outer radial extremity, before vaporization can occur. The centripetal force on the liquid through the flow tubes then forces the liquid/vapor out of the cells through the vent opening, thereby preventing vapor lock.

From the above descriptive summary, it is thus apparent how the present invention's internally liquid-cooled disc braking system overcomes the shortcomings of the above-mentioned prior art devices.

Accordingly, the primary objective of the present invention is to provide an internally liquid-cooled disc braking system that comprises an internally liquid-cooled disc in the form of a one piece casting so as to eliminate time consuming disc welding and system failures associated therewith.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIGS. 4A, 4B, and 4C are a side cross-sectional view, a left end view, and a right end cross-sectional view, respectively, of the one piece internally liquid-cooled disc shown in FIG. 2.

FIGS. 7A and 7B are a side cross-sectional view and a left end view, respectively, of the splined flange shown in FIG. 2.

PREFERRED EMBODIMENTS OF THE PRESENT INVENTION

Figure 1:
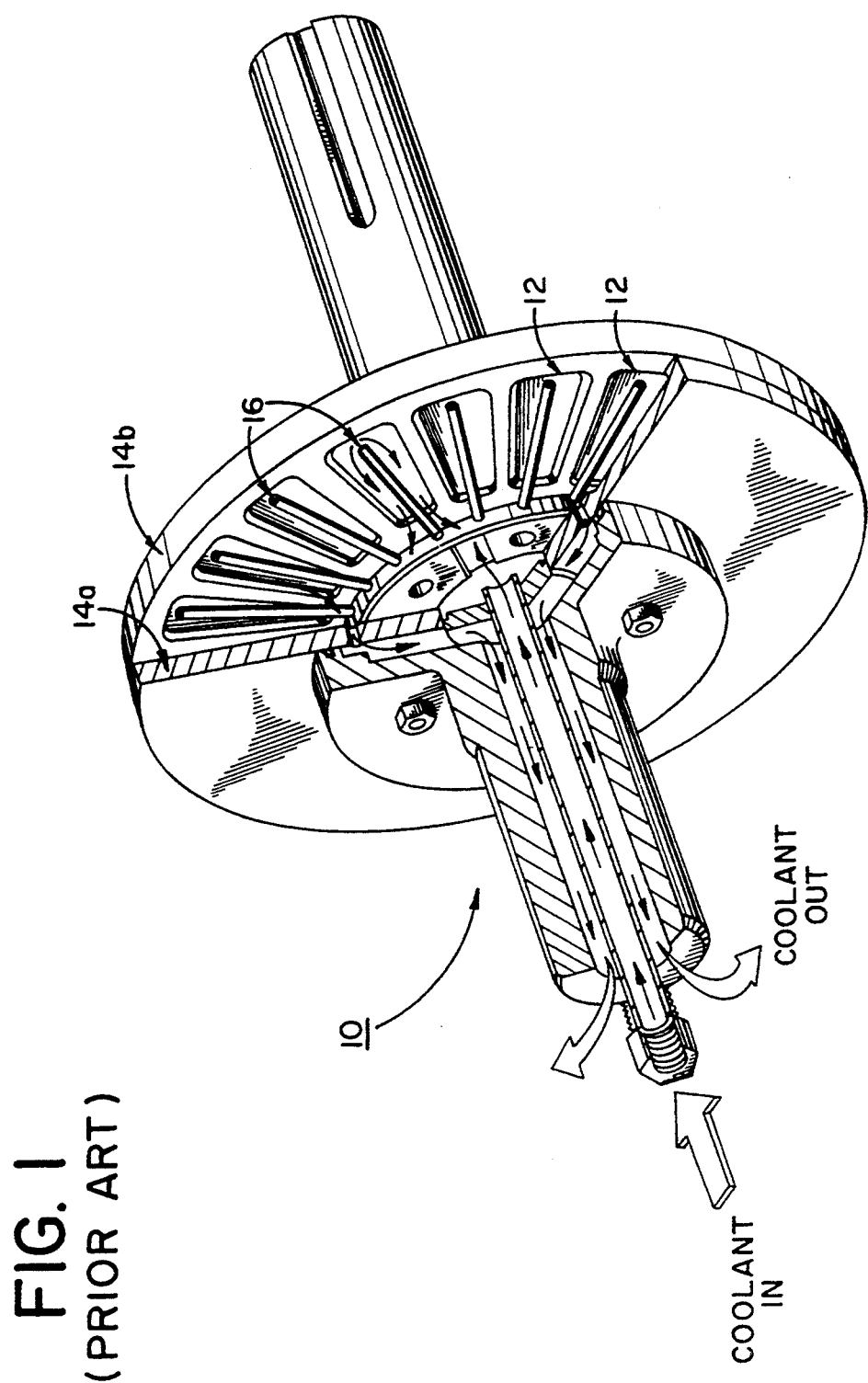
FIG. 1 is a three dimensional., partial cross-sectional view of a prior art two piece internally liquid-cooled disc and other associated components that may be used in an internally liquid-cooled disc braking system.
Figure 2:
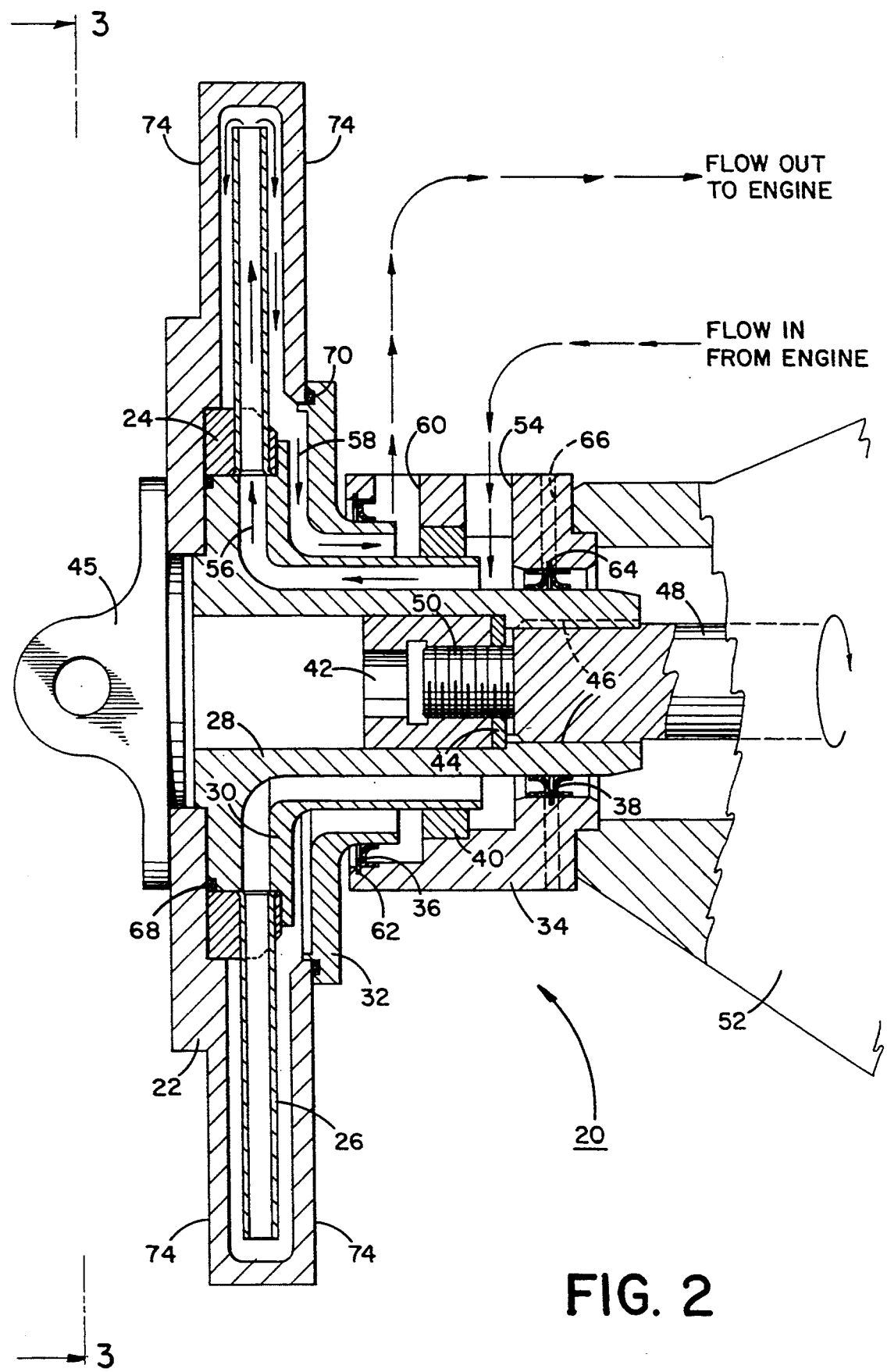
FIG. 2 is a side cross-sectional view of a present invention one piece internally liquid-cooled disc and other associated components that may be used in an internally liquid-cooled disc braking system, taken along line 2—2 of FIG. 3.

Referring to FIG. 2, there is shown an assembly 20, including an internally liquid-cooled disc in the form of a one piece casting 22, that may be used in an internally liquid-cooled disc braking system according to the present invention. It should be noted that, for the purpose of this description, the assembly 20 is being used within a drive train retarder system. Such a retarder system is essentially the same as a disc braking system, except that a retarder system retards the rotation of a drive shaft instead of a wheel axle. These systems are typically used on light trucks, and are particularly useful for reducing wear on wheel brakes when descending long, downhill grades. Of course, this assembly 20, or one substantially similar thereto, may also be used to assist in braking or retarding other types of rotating axles and shafts, or it may be used to assist in applying a desired reactive torque to an axle or shaft rotating at a given angular velocity, such as in a dynamometer.

The assembly 20 also includes a flow tube ring 24, a plurality of flow tubes 26, a splined flange 28, a separator flange 30, a seal flange 32, a seal housing 34 with associated front 36 and rear 38 seals, a bushing 40, a retaining nut 42 and washer 44, and a drive shaft U-joint flange 45. The splined flange 28 is engaged with a splined portion 46 of a rotatable rear axle pinion 48, and the retaining nut 42 and washer 44 are engaged with and around, respectively, a threaded end portion 50 of the pinion 48 so as to secure the splined flange 28 to the pinion 48. The drive shaft U-joint flange 45 is secured to a rotatable drive shaft (not shown). The one piece disc casting 22, the flow tube ring 24, the splined flange 28, the separator flange 30, the seal flange 32, and the drive shaft U-joint flange 45 are all secured to one another by assembly bolts (not shown), while the plurality of flow tubes 26 are held in place within the flow tube ring 24 by virtue of a snug fit relationship with the splined 28 and separator 30 flanges. The seal housing 34 is held in place by virtue of a press fit relationship with a stationary rear axle housing 52. Thus, the one piece disc casting 22, the flow tube ring 24, the plurality of flow tubes 26, the splined flange 28, the separator flange 30, the seal flange 32, and the drive shaft U-joint flange 45 are all rotatable in a coaxial relationship with respect to the stationary seal housing 34.

The assembly 20 receives cooling liquid from a typical engine cooling system (not shown) through an inlet port 54 formed in the seal housing 34. The cooling liquid flows along a path 56 between the splined flange 28 and the separator flange 30 and then through the flow tubes 26 before being dispersed within the one piece disc casting 22. The cooling liquid exits the one piece disc casting 22 and flows along a path 58 between the separator flange 28 and the seal flange 32 before returning to the engine cooling system through an outlet port 60 formed in the seal housing 34.

The bushing 40 acts as a low friction partial seal between the stationary seal housing 34 and the rotatable separator flange 30, thereby keeping separate the cooling liquid along the incoming 56 and outgoing 58 flow paths. The front seal 36 is a single seal which acts to prevent cooling liquid from escaping between the seal flange 32 and the seal housing 34. The rear seal 38 is a double seal which acts to prevent cooling liquid from escaping between the splined flange 28 and the seal housing 34 on one side, and to prevent gear lube oil, typically contained within the rear axle housing 52, from escaping between the splined flange 28 and the seal housing 34 on the other side. The front 36 and rear 38 seals are held in place by front 62 and rear 64 snap rings, respectively.

To prevent the cooling liquid and the gear lube oil from possibly contaminating each other, a pair of vent holes 66 are formed in the seal housing 34. The vent holes 66 allow either escaped cooling liquid or gear lube oil to be discharged from the assembly 20. The assembly 20 also prevents cooling fluid from escaping between the one piece disc casting 22, the flow tube ring 24, and the splined flange 28 by way of a first O-ring 68, which acts to form a hermetic seal where the three components 22, 24, 28 meet. Similarly, a second O-ring 70 forms a hermetic seal between the one piece casting 22 and the seal flange 32.

Figure 3:
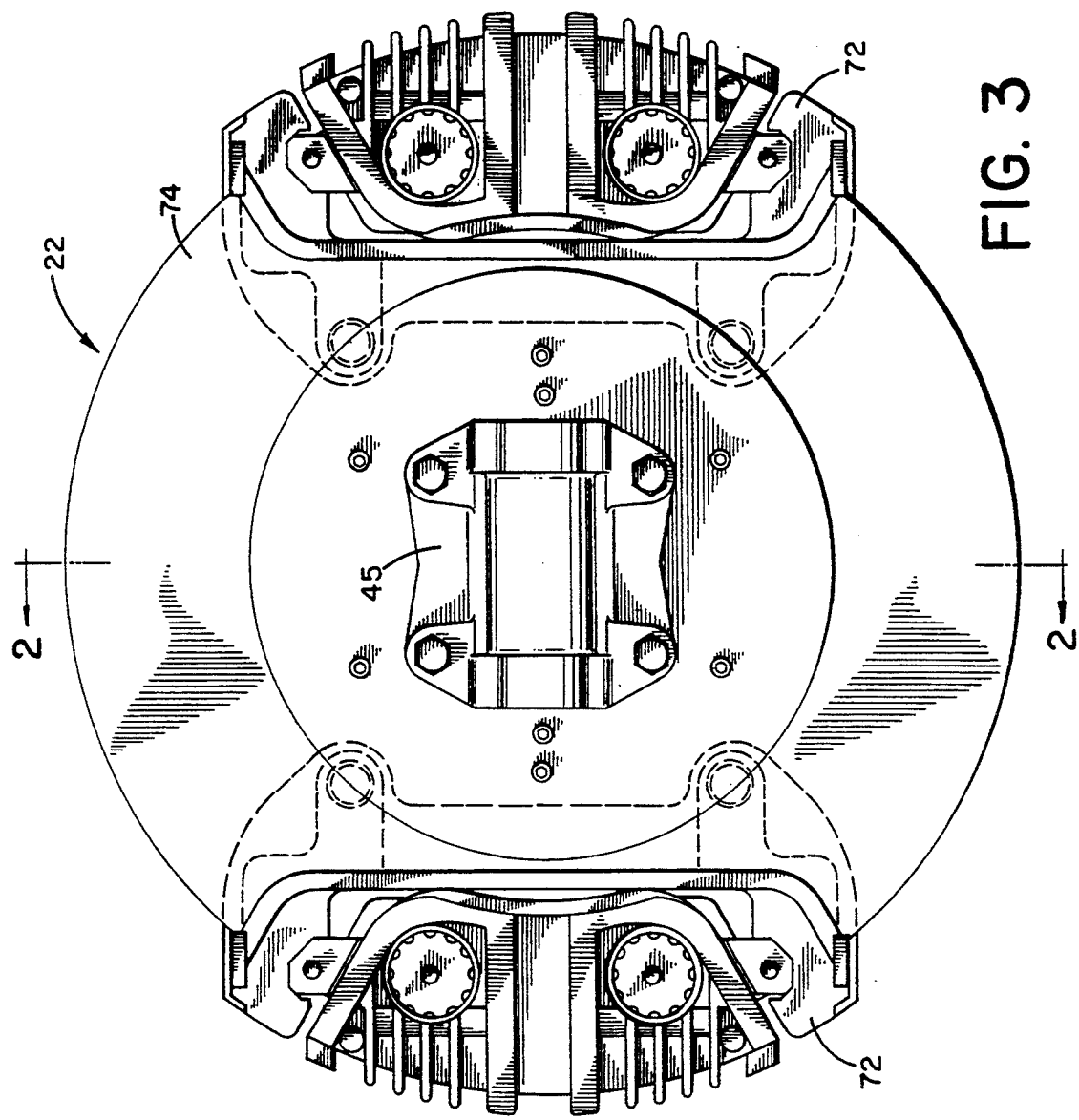
FIG. 3 is a left end view of the present invention assembly shown in FIG. 2 along with a pair of disc brake calipers, taken along line 3—3 of FIG. 2.

At this point it should be noted that FIG. 2 does not show a forced braking means for purposes of figure clarity. However, a forced braking means is required in a disc braking system, and a description of such a braking means in relation to the assembly 20 would be helpful in understanding the concept of the present invention. Thus, referring to FIG. 3, an end view of the assembly 20 is shown along with a typical forced braking means configuration. Such a configuration includes a pair of disc brake calipers 72, each of which is shown to straddle the one piece disc casting 22. Each caliper 72 typically supports two pairs of pistons (not shown) and a pair of brake pads (not shown). The brake pads, which are composed of a friction material, sandwich the one piece disc casting 22 along its outer opposed surfaces, or its braking surfaces 74. The two piston pairs lie between the brake pads and the one piece disc casting 22, with one pair on either side of the casting 22. Varying pressure, normally hydraulically controlled, can be applied to the calipers 72 to force the piston pairs against the brake pads. The brake pads, in turn, are forced against the braking surfaces 74 of the one piece disc casting 22, thereby causing a forced braking action. As previously described, the one piece disc casting 22 is secured to a rotatable drive shaft (not shown) by way of the drive shaft U-joint flange 45. Thus, in this particular configuration, the forced braking action is used to retard the rotation of the associated drive shaft.

Referring to FIGS. 4A, 4B, and 4C, the one piece disc casting 22 is shown in greater detail. The casting 22 may be fabricated from a variety of metals or metal composites, although it has been found that an aluminum composite reinforced with silicon-carbide particles is generally preferred. Such an aluminum composite ($SiC_p/Al$) has been developed by Duralcan USA, a division of Alcan Aluminum Corporation, San Diego, Calif. This composite is preferred since it is stiffer, stronger, more wear resistant, and has better thermal stability than its unreinforced counterparts. In addition, its coefficient of thermal expansion is lower. These advantages, plus low density and relatively low cost, help make this aluminum composite competitive with unreinforced aluminum, as well as with cast iron, steel, magnesium, and titanium.

The one piece disc casting 22 is fabricated using a sand core molding process such that a plurality of cooling cells 76 may be formed therein. Such a molding process is common where intricate designs are required and it is either difficult or impossible to produce such designs through conventional machining techniques. The cooling cells 76 are displaced radially around the one piece disc casting 22 and are situated in the area which becomes the hottest during the forced braking action (directly adjacent to the braking surfaces 74). Each cooling cell 76 is separated from an adjacent cooling cell by a separating wall, or rib 78. Each rib 78 comprises an inner and an outer pressure passage 80,82, respectively. Also, each cooling cell 76 provides an opening 84 along its radially innermost border.

The ribs 78 serve as a structural support for the one piece disc casting 22 in order to counteract the force applied by the braking pads against the braking surfaces 74. The ribs 78 also serve to conduct the heat generated during the forced braking action from the braking surfaces 74 to the cooling cells 76, where the heat can be transferred to the cooling liquid. The ribs 78 further provide additional surface area within each cooling cell 76 to facilitate maximum heat transfer.

The inner 80 and outer 82 pressure passages are formed in each rib 78 during the sand core molding process. The inner passages 80 are positioned towards the radially inner end of each rib 78, and the outer passages 82 are positioned towards the radially outer end of each rib 78. The inner 80 and outer 82 pressure passages act to equalize any differences in pressure occurring between any two adjacent cooling cells 76, and to pass cooling liquid therebetween if for some reason one of the cooling cells 76 is not receiving an adequate flow of cooling liquid.

As seen in FIGS. 2 and 4A-4C, the openings 84 are provided to allow the plurality of flow tubes 26 to be inserted into the corresponding plurality of cooling cells 76. The flow tubes 26 are inserted into the cooling cells 76 after passing through the flow tube ring 24. The flow tube ring 24 must, however, be positioned within the one piece disc casting 22 before the flow tubes 26 can be inserted into the cooling cells 76. The openings 84 are also provided to allow the cooling liquid to exit the cooling cells 76 along the outgoing flow path 58.

The one piece disc casting 22 has several groups 86,88,90 of variously sized holes bored therethrough. The first group 86 of holes allows assembly bolts (not shown), which engage with threaded holes in the splined flange 28, to be passed therethrough, thereby securing together the one piece casting 22 and the splined flange 32. The second group 88 of holes allows assembly bolts, which engage with threaded holes in the splined flange 28, to be passed therethrough, thereby securing together the U-joint flange 45, the one piece disc casting 22, and the splined flange 28. The third group 90 of holes allows assembly bolts, which engage with threaded holes in the seal flange 32, to be passed therethrough, thereby securing together the one piece casting 22, the flow tube ring 24, and the seal flange 32. The separator flange 30, as will be described shortly, is secured to the flow tube ring 24 by other assembly bolts. Thus, the one piece disc casting 22, the flow tube ring 24, the splined flange 28, the separator flange 30, the seal flange 32, and the drive shaft U-joint flange 45 are all secured to one another.

Figure 5B:
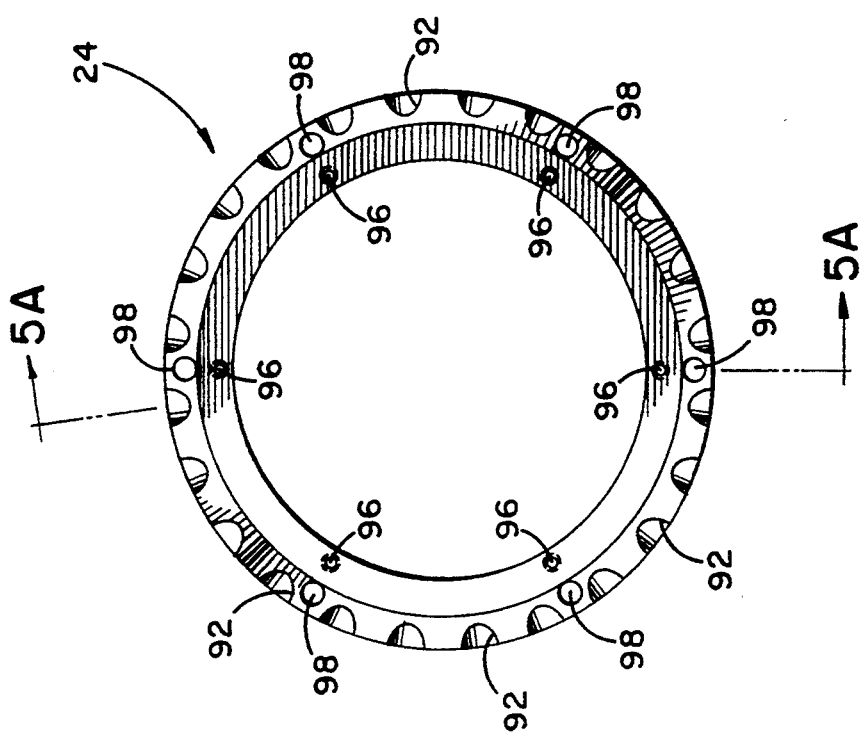
FIGS. 5A and 5B are a side cross-sectional view and a left end view, respectively, of the flow tube ring shown in FIG. 2.
Figure 5A:
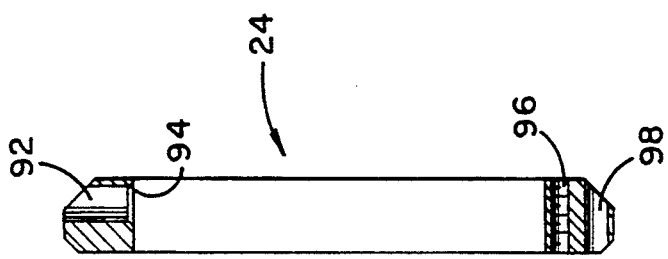

Referring to FIGS. 5A and 5B, the flow tube ring 24 is shown in greater detail. The flow tube ring 24 may be fabricated from a variety of metals or metal composites, although it has been found that aluminum is generally preferred because of its corrosion resistance and its similar thermal coefficient of expansion. The flow tube ring 24 comprises of plurality of holes 92 bored .radially therethrough. These plurality of holes 92 correspond to the plurality of flow tubes 26 and the plurality of cooling cells 76 such that the flow tubes 26 are inserted through the holes 92 and into the cooling cells 76 when the flow tube ring 24 is secured within the one piece casting 22. The radially inner opening 94 of each hole 92 is chamfered so as to prevent the flow tubes 26 from being inserted too far into the cooling cells 76, as will be shortly discussed in more detail.

The flow tube ring 24 has two groups of holes 96, 98 bored therethrough. The first group 96 of holes are threaded to allow the separator flange 30 to be bolted thereto, as previously discussed. The second group 98 of holes allows assembly bolts, which engage with threaded holes in the seal flange 32, to be passed therethrough, thereby securing together the one piece casting 22, the flow tube ring 24, and the seal flange 32, as previously discussed.

Figure 6:
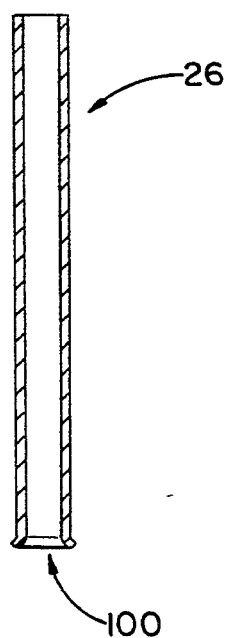
FIG. 6 is a side cross-sectional view of the flow tube shown in FIG. 2.

Referring to FIG. 6, a flow tube 26 is shown in greater detail. Similar to the flow tube ring 24, the flow tube 26 may be fabricated from a variety of metals or metal composites, although it has been found that aluminum is generally preferred because of its corrosion resistance. Each flow tube 26 is swaged at one end 100 so as to mate with the chamfered inner openings 94 of the flow tube ring 24. This swage prevents the flow tubes 26 from being inserted too far into the cooling cells 76, which would thwart the flow of cooling liquid. Thus, the swage allows cooling liquid to flow unimpeded down through the flow tubes 26 and out into the cooling cells 76 where it absorbs the heat generated during the forced braking action.

At this point it should be noted that the flow tube ring 24 and the plurality of flow robes 26 may be fabricated along with the one piece disc casting 22 in the sand core molding process. Although the design of the sand core in such a combined molding process would be somewhat complex, it is nonetheless feasible. And the one piece casting that would result from such a molding process would be cost effective by saving both the manufacturing and assembly costs of the separate flow tube ring 24 and the plurality of flow tubes 26.

One possible disadvantage could result from creating a one piece casting having the flow tube ting 24 and the plurality of flow tubes 26 incorporated therein, however. Heat generated during the forced braking action would be conducted from the braking surfaces 74 to the plurality of flow tubes 26 much more quickly in such a one piece casting than if the flow tubes 26 were separate components. Such an increase in heat in the plurality of flow tubes 26 could result in the cooling liquid becoming vaporized within the flow tubes 26, thereby increasing the possibility of the occurrence of vapor lock. To overcome such a possibility of vapor lock occurring, extensive thermal analysis should be performed on the one piece casting taking into account the materials used and the operating temperatures.

Referring to FIGS. 7A and 7B, the splined flange 28 is shown in greater detail. The splined flange 28, like all of the flanges, is fabricated from steel, preferably of the SAE-8620 variety because of its strength and finishing capabilities. The splined flange 28 has a splined portion 102 that engages with the splined portion 46 of the rotatable rear axle pinion 48. The splined flange 28 also has two groups 104,106 of holes bored through its base. The first group 104 of holes are threaded to allow the one piece disc casting 22 to be bolted thereto, as previously discussed. The second group 106 of holes is also threaded to allow the U-joint flange 45 and the one piece disc casting 22 to be bolted thereto, as previously discussed. The splined flange 28 also has a channel 107 machined around the perimeter of its base where the first O-ring 68 is seated.

Figure 8B:
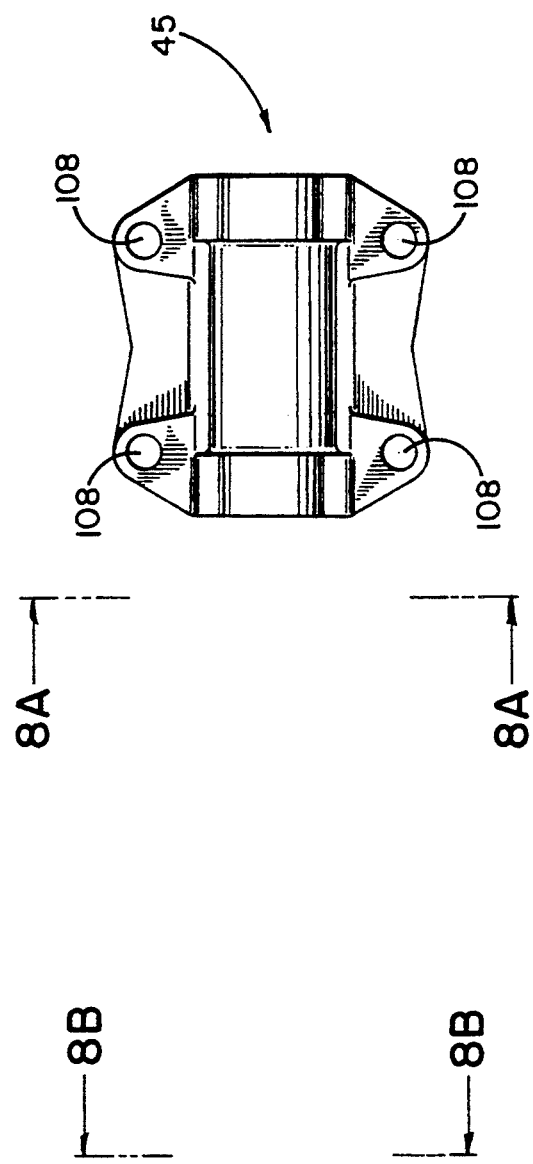
FIGS. 8A and 8B are a side view and a left end view, respectively, of the U-joint flange shown in FIG. 2.
Figure 8A:
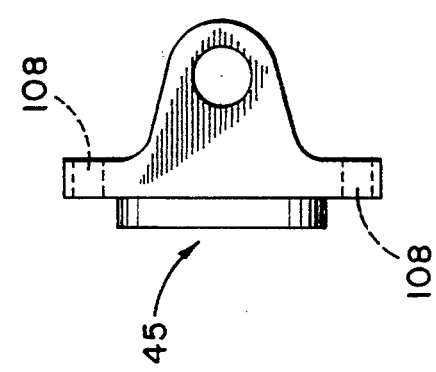

Referring to FIGS. 8A and 8B, the U-joint flange 45 is shown in greater detail. As previously described, the U-joint flange 45 is preferably fabricated from forged steel. The U-joint flange 45 has a group 108 of holes bored through its base. This group 108 of holes allows assembly bolts, which engage with threaded holes in the splined flange 28, to be passed therethrough, thereby securing the U-joint flange 45 to the one piece disc casting 22 and the splined flange 28, as previously discussed.

Figure 9B:
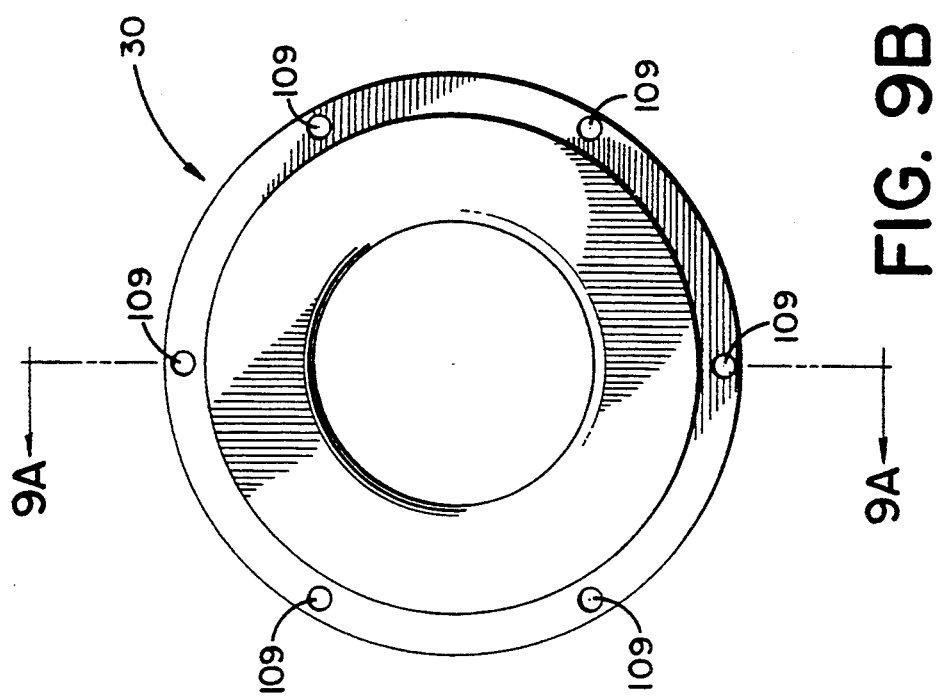
FIGS. 9A and 9B are a side cross-sectional view and a left end view, respectively, of the separator flange shown in FIG. 2.
Figure 9A:
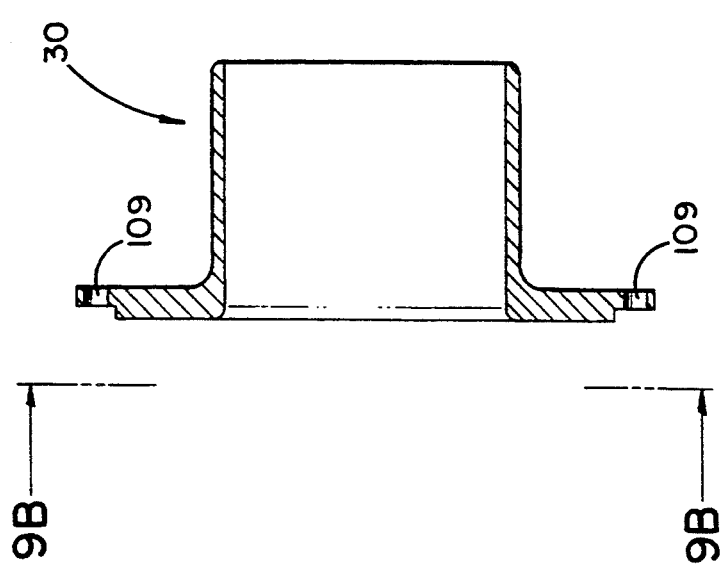

Referring to FIGS. 9A and 9B, the separator flange 30 is shown in greater detail. As previously described, the separator flange 30 is preferably fabricated from cast iron or steel. The separator flange 30 has a group 109 of holes bored through its base. This group 109 of holes allows assembly bolts, which engage with threaded holes in the flow tube ring 24, to be passed therethrough, thereby securing the separator flange 30 to the flow tube ring 24, as previously discussed.

Figure 10B:
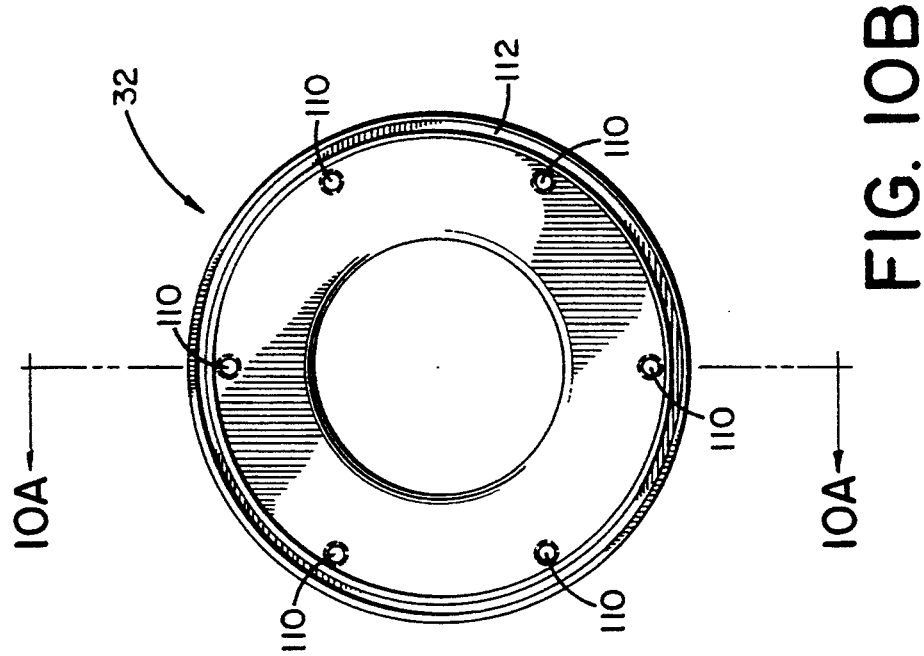
FIGS. 10A and 10B are a side cross-sectional view and a left end view, respectively, of the seal flange shown in FIG. 2.
Figure 10A:
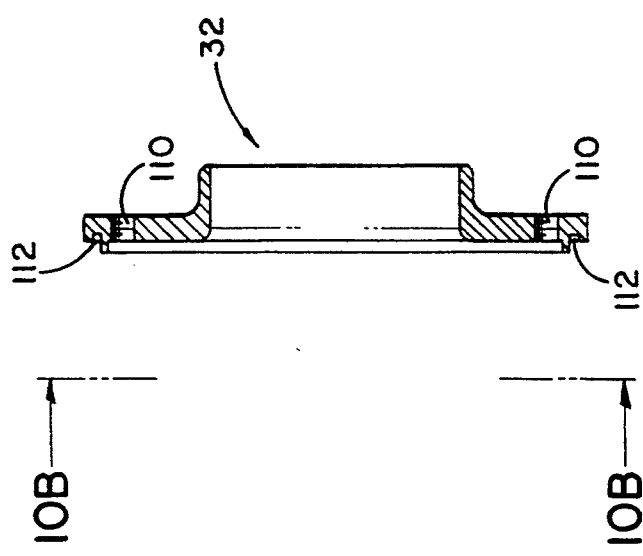

Referring to FIGS. 10A and 10B, the seal flange 32 is shown in greater detail. As previously described, the seal flange 32 is preferably fabricated from SAE-8620 steel. The seal flange 32 has a group 110 of holes bored through its base. This group 110 of holes are threaded to allow the one piece disc casting 22 and the flow tube ring 24 to be bolted thereto, as previously discussed. The seal flange 32 also has a channel 112 machined into its base where the second O-ring 70 is seated.

Figure 11C:
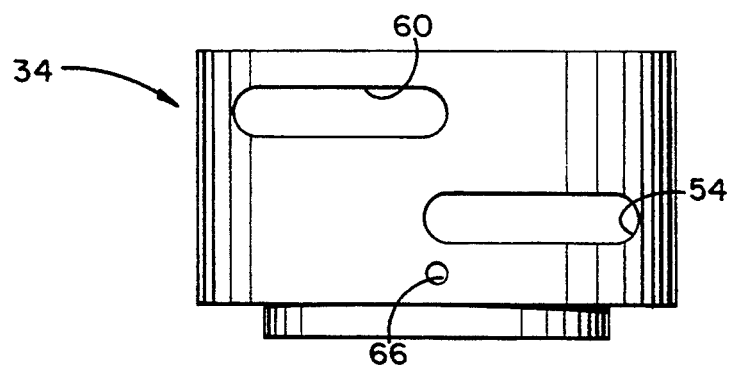
FIGS. 11A, 11B, and 11C are a side cross-sectional view, a left end view, and a side view, respectively, of the seal housing shown in FIG. 2.
Figure 11A:
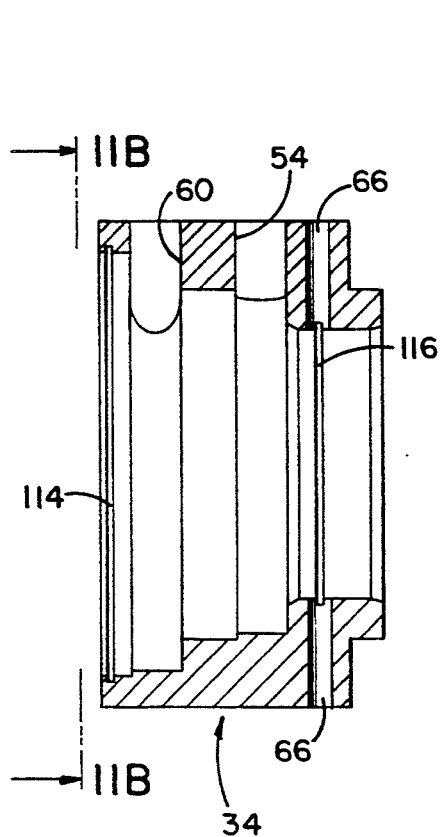
Figure 11B:
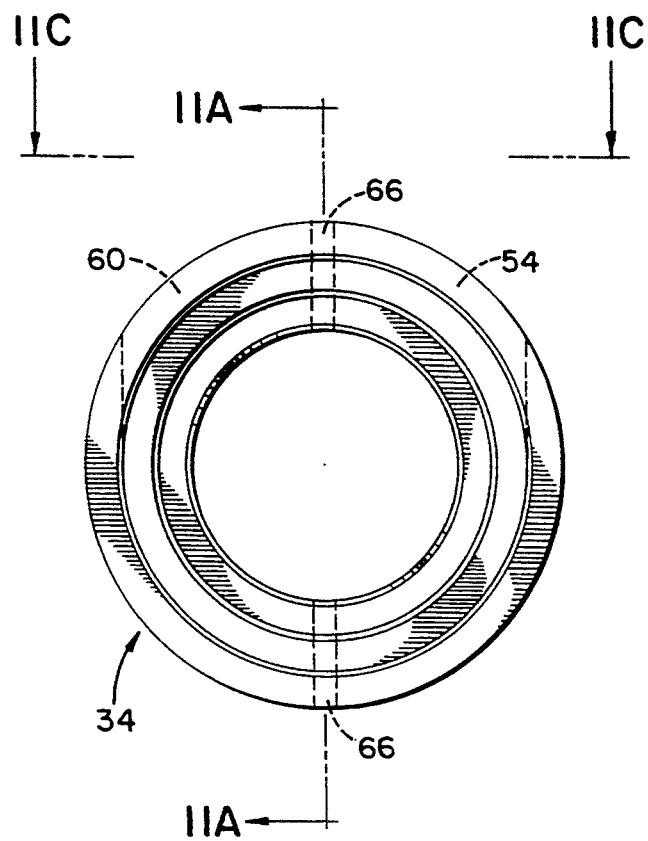

Referring to FIGS. 11A, 11B, and 11C, the seal housing 34 is shown in greater detail. The seal housing 34 is also preferably fabricated from mild steel or cast iron. The seal housing 34 has the inlet port 54, the outlet port 60, and the vent holes 66 bored through its walls so as to allow the input and the output of cooling liquid and the discharge of both cooling liquid and gear lube oil, respectively. The seal housing 34 also has front 114 and rear 116 channels machined into its inner walls where the front 62 and rear 64 snap rings are seated, respectively.

Figure 12B:
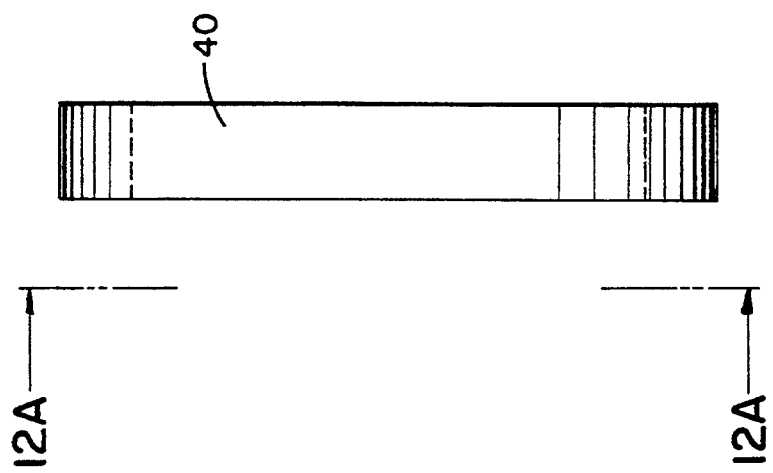
FIGS. 12A and 12B are an end view and a side view, respectively, of the bushing shown in FIG. 2.
Figure 12A:
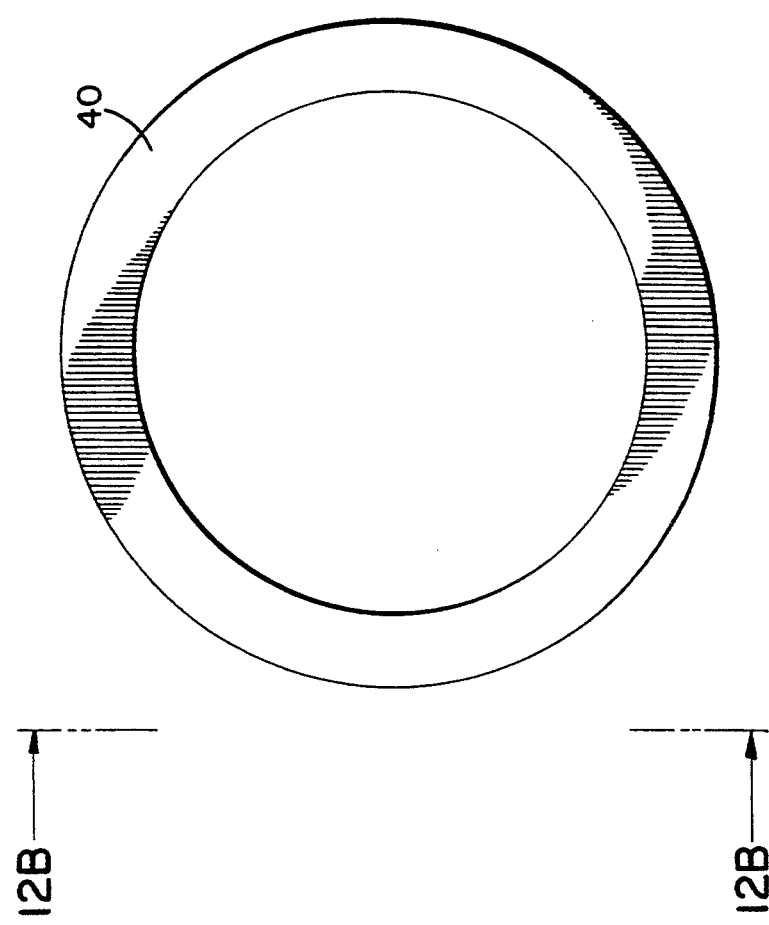

Referring to FIGS. 12A and 12B, the bushing 40 is shown in greater detail. The bushing 40 may be fabricated from a variety of materials, although it has been found that either brass or bronze is generally preferred because of bearing characteristics. As previously described, the bushing 40 acts a low friction partial seal between the stationary seal housing 34 and the rotatable separator flange 30.

Figure 13B:
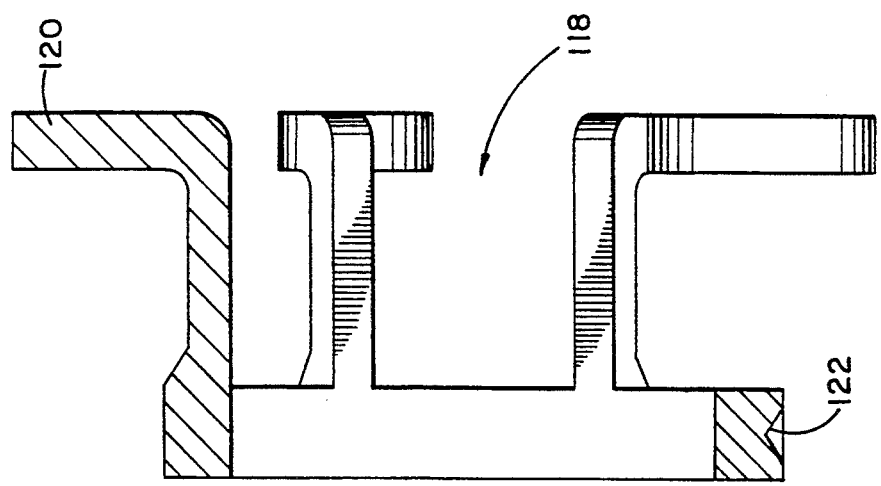
FIGS. 13A and 13B are a right end view and a side cross-sectional view, respectively, of a bushing having an embodiment alternate to that of the bushing shown in FIGS. 12A and 12B, that is shown in the assembly of FIG. 14.
Figure 13A:
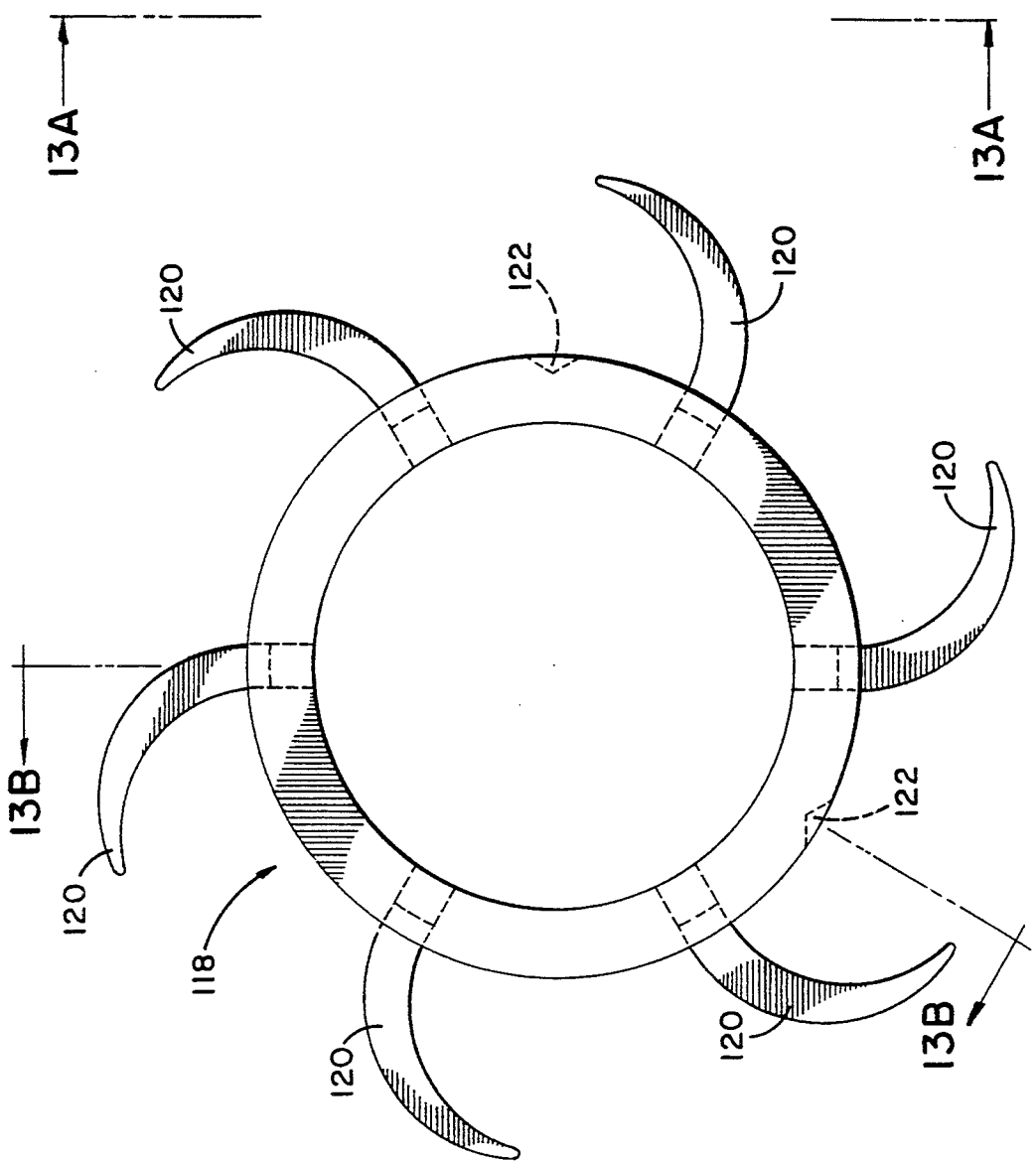

Referring to FIGS. 13A and 13B, an alternate embodiment of a bushing 118 is shown. This bushing 118 has a plurality of stator vanes 120 extruding therefrom which are curved so as to create a pumping action with the cooling liquid along the outgoing flow path 58. To achieve this pumping action, the bushing 118 must be secured to the stationary seal housing 34 while the rest of the assembly 20 is rotating in a coaxial relationship thereto. Thus, a pair of drill points 122 are machined into the outer surface of the bushing 118 so as to assist in securing the bushing 118 to an alternate embodiment seal housing 124, which will now be described.

Figure 14:
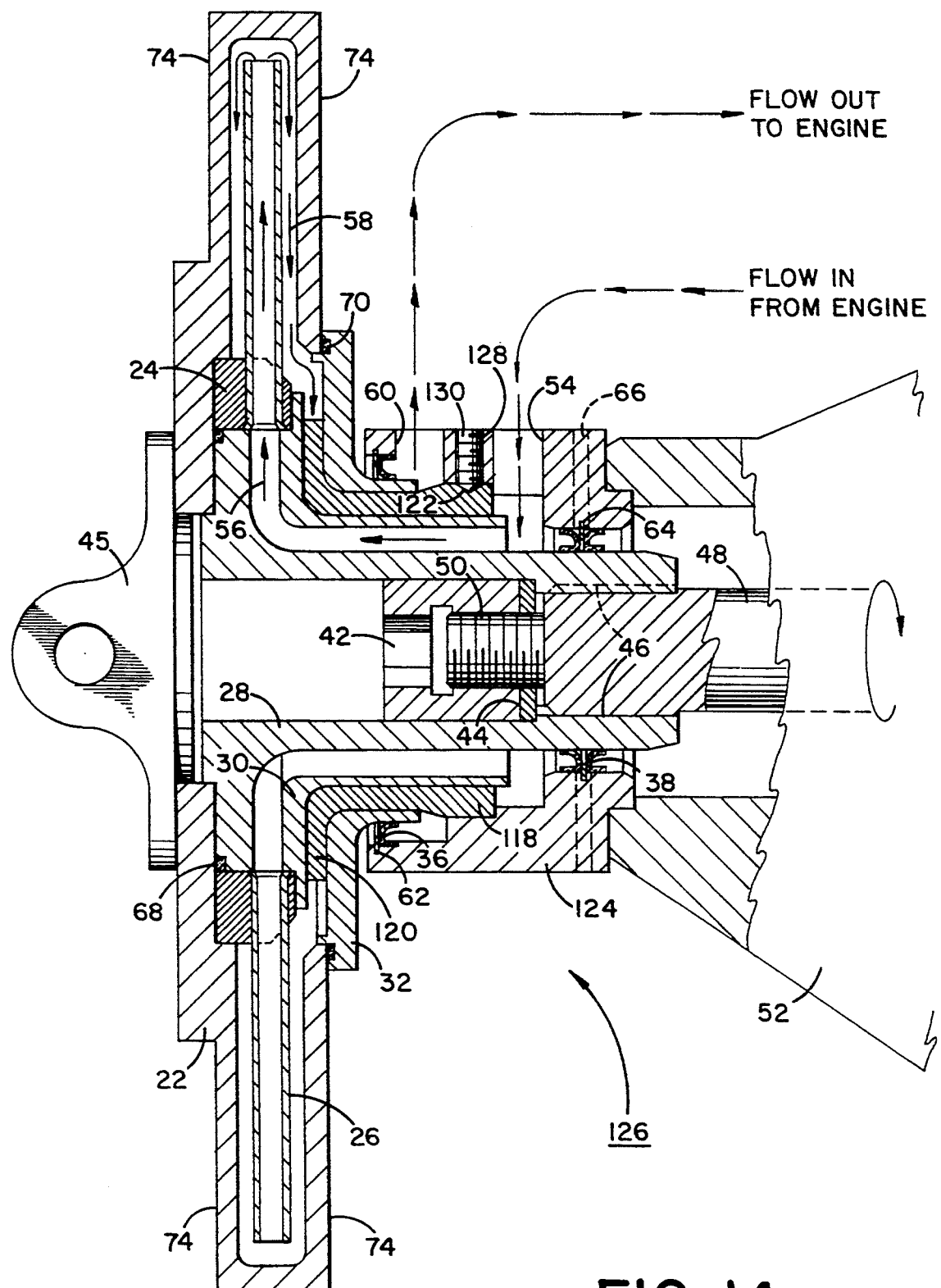
FIG. 14 is a side cross-sectional view of an alternate embodiment of the present invention assembly shown in FIG. 2, incorporating the alternate embodiment bushing shown in FIGS. 13A and 13B.

Referring to FIG. 14, there is shown an alternate embodiment assembly 126 with the alternate embodiment bushing 118 and the alternate embodiment seal housing 124. The seal housing 124 has a pair (only one shown) of threaded holes 128 bored through its wall which correspond to the pair of drill points 122 machined into the outer surface of the bushing 118. A corresponding pair 130 (only one shown) of set screws are engaged with the threaded holes 128 and are accepted by the drill points 122, thereby securing the bushing 118 to the seal housing 124. The pumping action is then achieved when the direction of rotation of the assembly 126 is opposite to the direction of curvature of the stator vanes 120. Thus, the cooling liquid is essentially scooped radially inward by the stator vanes 120, thereby forcing the cooling liquid along the outgoing flow path 58. Such a pumping action can assist an existing engine cooling liquid pump so that no additional burden is placed thereon when the drive train retarder system, or a similar type of disc braking system incorporating this assembly 126, is used. Like the original bushing 40, the alternate embodiment bushing 118 is preferably fabricated from either brass or bronze.

Figure 15:
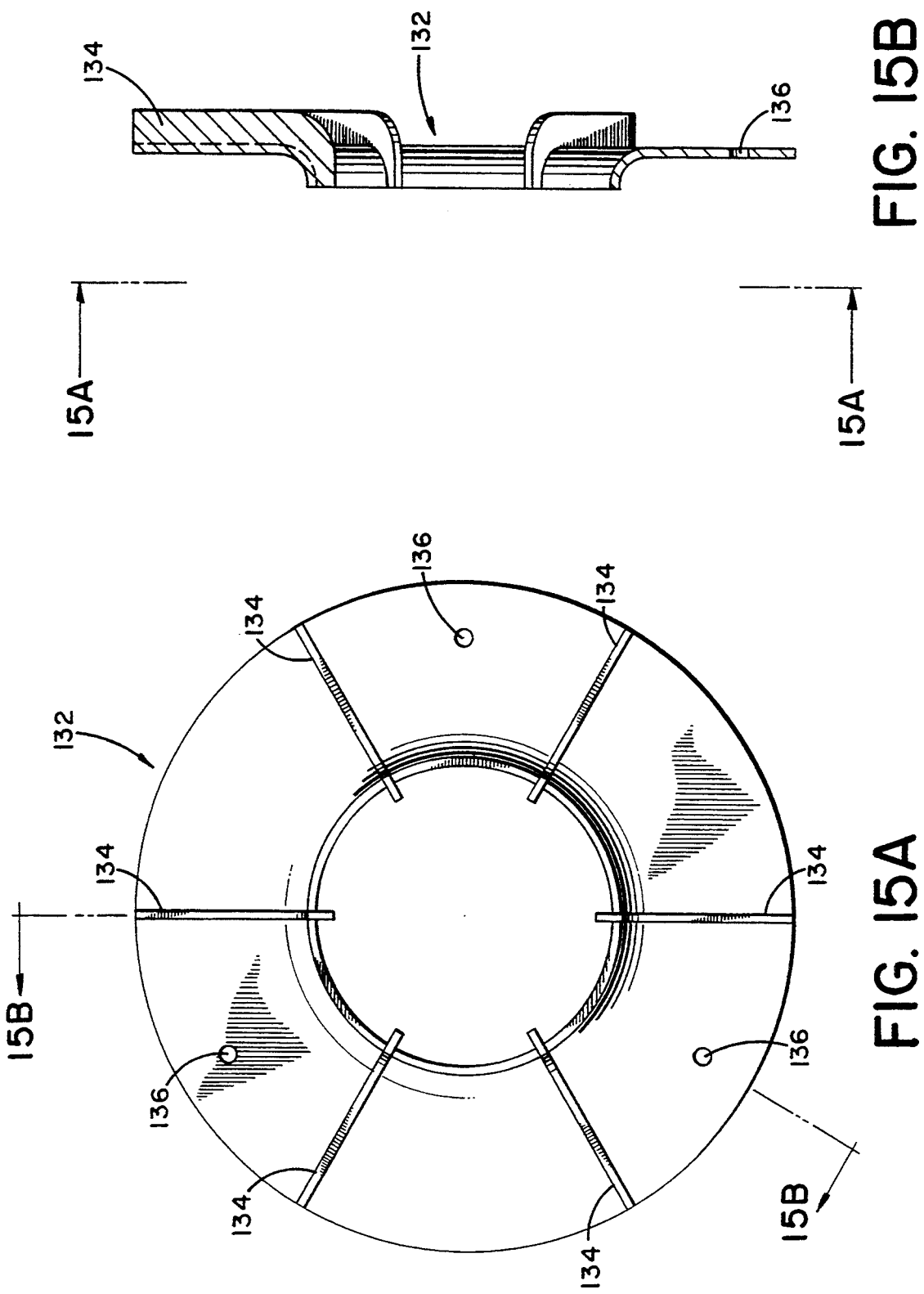
FIGS. 15A and 15B are a left end view and a side cross-sectional view, respectively, of an impeller that is shown in the assembly of FIG. 16.

Referring to FIGS. 15A and 15B, an impeller 132 is shown. This impeller 132 has a plurality of fins 134 projecting therefrom which may be used to assist in propelling the cooling liquid along the incoming flow path 56. To achieve this propelling action, the impeller 132 can be secured to the separator flange 30 or the splined flange 28. Thus, a group of holes 136 are bored through the surface of the impeller 132 so as to allow the impeller 132 to be bolted to an alternate embodiment separator flange 138 or splined flange 28, which will now be described.

Figure 16:
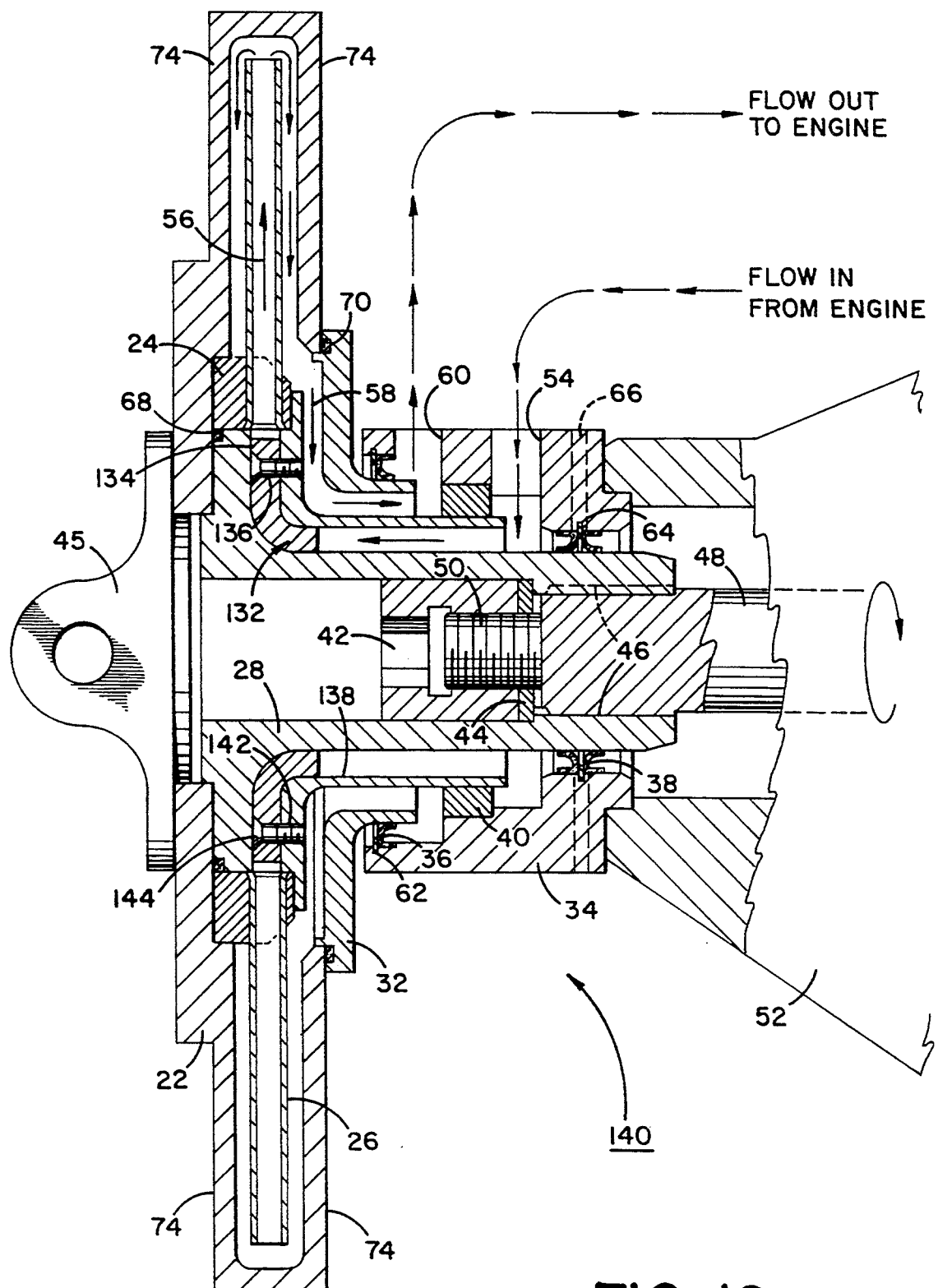
FIG. 16 is a side cross-sectional view of an alternate embodiment of the present invention assembly shown in FIG. 2, incorporating the impeller shown in FIGS. 15A and 15B.

Referring to FIG. 16, there is shown an alternate embodiment assembly 140 with the impeller 132 and the alternate embodiment separator flange 138. The separator flange 138 has a group 142 (only two shown) of threaded holes bored into its base which correspond to the group 136 of holes bored through the surface of the impeller 132. A corresponding group 144 (only two shown) of bolts are passed through the holes 136 of the impeller 132 so as to engage with the threaded holes 142 of the separator flange 138, thereby securing the impeller 132 to the separator flange 138. The propelling action is then achieved when the initially axially flowing cooling liquid flows towards the fins 134 of the impeller 132 as a result of the rotation of the assembly 140. The cooling liquid is thus brought up to the speed of the rotating assembly 140 so as to prepare it for entry into the flow tubes 26 along the incoming flow path 56. Similar to the stator vanes 120, such a propelling action can assist an existing engine cooling liquid pump and may only be required if the engine water pump is insufficient to provide necessary cooling liquid flow so that no additional burden is placed thereon when the drive train retarder system, or a similar type of disc braking system incorporating this assembly 126, is used. Like the separator flange 138 it is attached thereto, the impeller 132 is preferably fabricated from SAE-8620 steel.

Figure 18A:
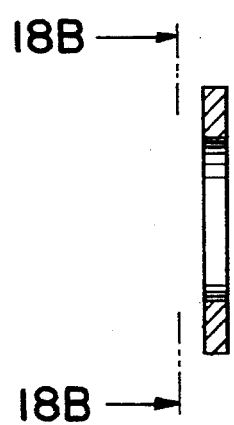
FIGS. 18A and 18B are a side cross-sectional view and a left end view, respectively, of the washer shown in FIG. 2.
Figure 18B:
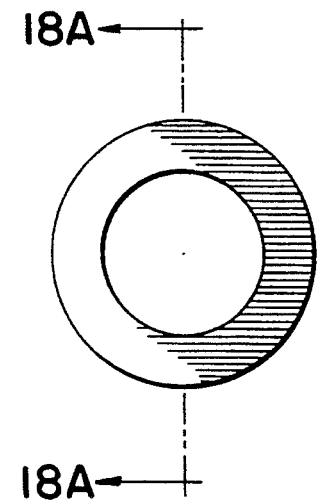
Figure 17A:
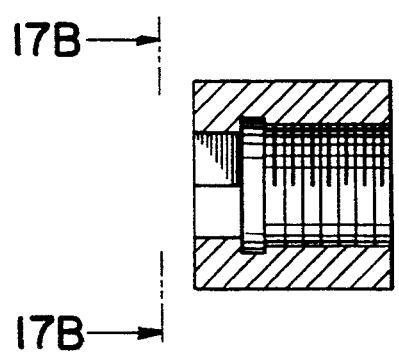
FIGS. 17A and 17B are a side cross-sectional view and a left end view. respectively, of the retaining nut shown in FIG. 2.
Figure 17B:
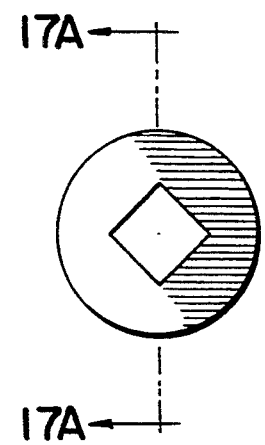

Referring to FIGS. 17A and 17B, the retaining nut 42 is shown in greater detail. Referring to FIGS. 18A and 18B, the washer 44 is shown in greater detail. Both the retaining nut 42 and the washer 44 are fabricated from steel, preferably of the SAE-4140 variety because of its strength.

With the present invention assemblies 20, 126, and 140 now fully described it can thus be seen that the primary objective set forth above is efficiently attained and, since certain changes may be made in the above described assemblies 20, 126, and 140 without departing from the scope of the invention, it is intended that all matter contained in the above description or shown in the accompanying drawings shall be interpreted as illustrative and not in a limiting sense.

What is claimed is:

1. An improved internally liquid-cooled disc assembly for use in a disc braking system, said disc braking system having a rotatable shaft for transferring rotational energy to said disc assembly and a forced braking means for applying friction against said disc assembly so as to retard said rotational energy, said improved internally liquid-cooled disc assembly comprising:
   A. a one-piece disc casting having:
      (1) means for securing said rotatable shaft thereto such that rotation of said rotatable shaft causes rotation of said one-piece disc casting;
      (2) first and second braking surfaces on opposing sides of said one-piece disc casting, each said braking surface configured to accept friction applied by said forced braking means of said disc braking system; and
      (3) at least one cooling cell formed within said one-piece disc casting, each said cooling cell being designed so as to allow a cooling liquid to enter therein and a heated cooling liquid/gas to exit therefrom, said cooling liquid acting to remove thermal energy from said one-piece disc casting by thermal absorption thereby producing said heated cooling liquid/gas;
   B. means for conveying said cooling liquid to a radially extended portion of each said cooling cell so as to prevent a vapor lock condition, said conveying means having a first end and a second end associated with each said cooling cell, each said first end positioned radially inward with respect to each said associated cooling cell for receiving said cooling liquid, each said second end positioned radially outward within each said associated cooling cell for discharging said cooling liquid toward said radially extended portion of each said associated cooling cell; and
   C. a plurality of flanges for directing said cooling liquid to each said first end of said conveying means and for directing said heated cooling liquid/gas from each said cooling cell, said plurality of flanges comprising a first flange and a second flange with an incoming flow path formed annularly therebetween, said first flange and said second flange being positioned radially inward with respect to each said first end of said conveying means while also being operatively mated therewith such that said cooling liquid may be supplied directly to each said first end along said incoming flow path, said plurality of flanges further comprising said second flange and a third flange with an outgoing flow path formed annularly therebetween, said second flange and said third flange being positioned radially inward with respect to each said cooling cell while also being operatively mated therewith such that said heated cooling liquid/gas may be removed directly from each said cooling cell along said outgoing flow path.

2. The improved internally liquid-cooled disc assembly as defined in claim 1, wherein said first and second braking surfaces each extend between an inner radial position and an outer radial position with respect to said one-piece disc casting, and wherein each said cooling cell extends between these inner and outer radial positions.

3. The improved internally liquid-cooled disc assembly as defined in claim 2, wherein there is a plurality of said cooling cells, and wherein said one-piece disc casting has a corresponding plurality of radially disposed partitions formed therein so as to separate adjacent cooling cells.

4. The improved internally liquid-cooled disc assembly as defined in claim 3, wherein each of said plurality of radially disposed partitions has at least one passage formed therein so as to allow said cooling liquid and said heated cooling liquid/gas to pass between said adjacent cooling cells.

5. The improved internally liquid-cooled disc assembly as defined in claim 1, wherein said second flange acts to separate said incoming and outgoing flow paths.

6. The improved internally liquid-cooled disc assembly as defined in claim 5, wherein said first, second, and third flanges are fastenably secured to said one-piece disc casting so as to allow their rotation therewith.

7. The improved internally liquid-cooled disc assembly as defined in claim 6, wherein the innermost and outermost flanges of said first, second, and third flanges are hermetically sealed to said one-piece disc casting so as to prevent cooling liquid and heated cooling liquid/gas from leaking therebetween.

8. The improved internally liquid-cooled disc assembly as defined in claim 7, wherein said incoming and outgoing flow paths are further separated by a stationary housing disposed in an operative relationship with said first, second, and third flanges, wherein said housing has an inlet port and an outlet port formed therein corresponding to said incoming and outgoing flow paths, respectively, and wherein said housing is sealed against said first, second, and third flanges in such a manner so as to allow their rotation thereagainst while still maintaining said separate incoming and outgoing flow paths therethrough.

9. The improved internally liquid-cooled disc assembly as defined in claim 8, wherein said disc assembly further comprises means for creating a pumping action with said heated cooling liquid/gas along said outgoing flow path.

10. The improved internally liquid-cooled disc assembly as defined in claim 9, wherein said pumping means comprises a plurality of stator vanes fastenably secured to said stationary housing and extended along said outgoing flow path between said second and third flanges, and wherein said pumping action is created when the rotation of said one-piece disc casting and said second and third flanges causes said outgoing heated cooling liquid/gas to be forced against said plurality of stationary stator vanes, thereby forcing said heated cooling liquid/gas along said outgoing flow path.

11. The improved internally liquid-cooled disc assembly as defined in claim 9, wherein said disc assembly further comprises means for creating a propelling action with said cooling liquid along said incoming flow path.

12. The improved internally liquid-cooled disc assembly as defined in claim 11, wherein said propelling means comprises a plurality of impeller fins secured within said rotatable portion of said disc assembly along said incoming flow path between said first and second flanges, and wherein said propelling action is created when the rotation of said one-piece disc casting and said first and second flanges causes said incoming cooling liquid to be forced against said plurality of rotating impeller fins, thereby forcing said cooling liquid along said incoming flow path.

13. The improved internally liquid-cooled disc assembly as defined in claim 12, wherein said plurality of impeller fins are secured to said second flange.

14. The improved internally liquid-cooled disc assembly as defined in claim 1, wherein said conveying means comprises a plurality of flow tubes, wherein each of said plurality of flow tubes has a first end corresponding to said first end of said conveying means and a second end corresponding to said second end of said conveying means, and wherein each of said plurality of flow tubes is positioned radially with respect to the center of said one-piece disc casting.

15. The improved internally liquid-cooled disc assembly as defined in claim 14, wherein said one-piece disc casting further comprises an annular region located radially inward with respect to said plurality of cooling cells, and wherein a retaining ring is positioned within said annular region abutting said plurality of cooling cells, said retaining ring having a corresponding plurality of radially directed throughholes aligned with said plurality of cooling cells through which said plurality of flow tubes are extended.

16. The improved internally liquid-cooled disc assembly as defined in claim 15, wherein said first end of each of said plurality of flow tubes is swaged so as to prevent said first end of each of said plurality of flow tubes from passing through said retaining 17. The improved internally liquid-cooled disc assembly as defined in claim 16, wherein said disc assembly comprises twenty four cooling cells, twenty four flow tubes, and twenty four throughholes.

18. An improved internally liquid-cooled disc assembly for use in a disc braking system, said disc braking system having a rotatable shaft for transferring rotational energy to said disc assembly and a forced braking means for applying friction against said disc assembly so as to retard said rotational energy, said improved internally liquid-cooled disc assembly comprising:

A. a one-piece disc casting having:
  (1) means for securing said rotatable shaft thereto such that rotation of said rotatable shaft causes rotation of said one-piece disc casting;
  (2) first and second braking surfaces on opposing sides of said one-piece disc casting, each said braking surface configured to accept friction applied by said forced braking means of said disc braking system;
  (3) at least one cooling cell formed within said one-piece disc casting, each said cooling cell being designed so as to allow a cooling liquid to enter therein and a heated cooling liquid/gas to exit therefrom, said cooling liquid acting to remove thermal energy from said one-piece disc casting by thermal absorption thereby producing said heated cooling liquid/gas; and
  (4) means for conveying said cooling liquid to a radially extended portion of each said cooling cell so as to prevent a vapor lock condition, said conveying means having a first end and a second end associated with each said cooling cell, each said first end positioned radially inward with respect to each said associated cooling cell for receiving said cooling liquid, each said second end positioned radially outward within each said associated cooling cell for discharging said cooling liquid toward said radially extended portion of each said associated cooling cell; and B. a plurality of flanges for directing said cooling liquid to each said first end of said conveying means and for directing said heated cooling liquid/gas from each said cooling cell, said plurality of flanges comprising a first flange and a second flange with an incoming flow path formed annularly therebetween, said first flange and said second flange being positioned radially inward with respect to each said first end of said conveying means while also being operatively mated therewith such that said cooling liquid may be supplied directly to each said first end along said incoming flow path, said plurality of flanges further comprising said second flange and a third flange with an outgoing flow path formed annularly therebetween, said second flange and said third flange being positioned radially inward with respect to each said cooling cell while also being operatively mated therewith such that said heated cooling liquid/gas may be removed directly from each said cooling cell along said outgoing flow path.

19. The improved internally liquid-cooled disc assembly as defined in claim 18, wherein said first and second braking surfaces each extend between an inner radial position and an outer radial position with respect to said one-piece disc casting, and wherein each said cooling cell extends between these inner and outer radial positions.

20. The improved internally liquid-cooled disc assembly as defined in claim 19, wherein there is a plurality of said cooling cells, and wherein said one-piece disc casting has a corresponding plurality of radially disposed partitions formed therein so as to separate adjacent cooling cells.

21. The improved internally liquid-cooled disc assembly as defined in claim 20, wherein each of said plurality of radially disposed partitions has at least one passage formed therein so as to allow said cooling liquid and said heated cooling liquid/gas to pass between said adjacent cooling cells.

22. The improved internally liquid-cooled disc assembly as defined in claim 18, wherein said second flange acts to separate said incoming and outgoing flow paths.

23. The improved internally liquid-cooled disc assembly as defined in claim 22, wherein said first, second, and third flanges are fastenably secured to said one-piece disc casting so as to allow their rotation therewith.

24. The improved internally liquid-cooled disc assembly as defined in claim 23, wherein the innermost and outermost flanges of said first, second, and third flanges are hermetically sealed to said one-piece disc casting so as to prevent cooling liquid and heated cooling liquid/gas from leaking therebetween.

25. The improved internally liquid-cooled disc assembly as defined in claim 24, wherein said incoming and outgoing flow paths are further separated by a stationary housing disposed in an operative relationship with said first, second, and third flanges, wherein said housing has an inlet port and an outlet port formed therein corresponding to said incoming and outgoing flow paths, respectively, and wherein said housing is sealed against said first, second, and third flanges in such a manner so as to allow their rotation thereagainst while still maintaining said separate incoming and outgoing flow paths therethrough.

26. The improved internally liquid-cooled disc assembly as defined in claim 25, wherein said disc assembly further comprises means for creating a pumping action with said heated cooling liquid/gas along said outgoing flow path.

27. The improved internally liquid-cooled disc assembly as defined in claim 26, wherein said pumping means comprises a plurality of stator vanes fastenably secured to said stationary housing and extended along said outgoing flow path between said second and third flanges, and wherein said pumping action is created when the rotation of said one-piece disc casting and said second and third flanges causes said outgoing heated cooling liquid/gas to be forced against said plurality of stationary stator vanes, thereby forcing said heated cooling liquid/gas along said outgoing flow path.

28. The improved internally liquid-cooled disc assembly as defined in claim 25, wherein said disc assembly further comprises means for creating a propelling action with said cooling liquid along said incoming flow path.

29. The improved internally liquid-cooled disc assembly as defined in claim 28, wherein said propelling means comprises a plurality of impeller fins secured within said rotatable portion of said disc assembly along said incoming flow path between said first and second flanges, and wherein said propelling action is created when the rotation of said one-piece disc casting and said first and second flanges causes said incoming cooling liquid to be forced against said plurality of rotating impeller fins, thereby forcing said cooling liquid along said incoming flow path.

30. The improved internally liquid-cooled disc assembly as defined in claim 29, wherein said plurality of impeller fins are secured to said second flange.

31. The improved internally liquid-cooled disc assembly as defined in claim 18, wherein said conveying means comprises a plurality of flow tubes formed within said one-piece disc casting, wherein each of said plurality of flow tubes has a first end corresponding to said first end of said conveying means and a second end corresponding to said second end of said conveying means, and wherein each of said plurality of flow tubes is positioned radially outward with respect to the center of said one-piece disc casting.

32. The improved internally liquid-cooled disc assembly as defined in claim 31, wherein said one-piece disc casting is formed with twenty four cooling cells and twenty four flow tubes.

* * * * *

UNITED STATES PATENT AND TRADEMARK OFFICE
CERTIFICATE OF CORRECTION

PATENT NO. : 5,358,077
DATED : October 25, 1994
INVENTOR(S) : John P. DeConti

It is certified that error appears in the above-indentified patent and that said Letters Patent is hereby corrected as shown below:

Column 1, line 30, change "row,ting" to —rotating—
Column 4, line 64, change "." to —,—after "view"
Column 6, line 54, change "Calif" to —California—
Column 7, line 66, delete "." after "bored"
Column 8, line 32, change "robes" to —tubes—
       line 42, after "tube" change "ting" to —ring—
Column 12, line 31, delete ":" prior to "formed"
Column 13, line 27, after "retaining" insert —ring—

Signed and Sealed this

Twenty-eight Day of February, 1995

Attest:

BRUCE LEHMAN

Attesting Officer      Commissioner of Patents and Trademarks